United States Patent

Erga

[11] Patent Number: 5,108,625
[45] Date of Patent: Apr. 28, 1992

[54] PROCESS FOR REMOVING SODIUM SULFATE FROM AQUEOUS BUFFER SOLUTIONS

[75] Inventor: Olav Erga, Jakobsli, Norway

[73] Assignee: Sintef, Trondheim, Norway

[21] Appl. No.: 571,594

[22] PCT Filed: Feb. 23, 1989

[86] PCT No.: PCT/NO89/00015

§ 371 Date: Aug. 22, 1990

§ 102(e) Date: Aug. 22, 1990

[87] PCT Pub. No.: WO89/07973

PCT Pub. Date: Sep. 8, 1989

[30] Foreign Application Priority Data

Feb. 24, 1988 [NO] Norway .................................. 880807

[51] Int. Cl.$^5$ .............................................. B01D 1/00
[52] U.S. Cl. ............................... 210/767; 23/302 T; 210/737; 423/212; 423/242; 423/551; 423/553
[58] Field of Search ............... 423/242, 243, 554, 539, 423/212, 222, 305, 551, 553; 23/302 T; 210/767, 737

[56] References Cited

U.S. PATENT DOCUMENTS

| | | | |
|---|---|---|---|
| Re. 31,326 | 5/1983 | Saitoh et al. | 423/243 |
| T970,008 | 5/1978 | Kohler et al. | 423/243 |
| 2,521,367 | 9/1950 | Hegan | 423/551 |
| 4,080,428 | 3/1978 | Hölter et al. | 423/242 |
| 4,140,751 | 2/1979 | Vasan | 423/243 |
| 4,216,189 | 8/1980 | Nicholson et al. | 423/242 |
| 4,310,691 | 1/1982 | Bengtsson et al. | 562/584 |
| 4,366,134 | 12/1982 | Korosy et al. | 423/243 |
| 4,559,212 | 12/1985 | Erga | 423/243 |
| 4,948,572 | 8/1990 | Erga | 423/242 |

FOREIGN PATENT DOCUMENTS 429200 8/1983 Sweden .

OTHER PUBLICATIONS

Derwent Abstract No. 83-819244/46.
Abstract For WO 87/01612, Mar. 26, 1987.

*Primary Examiner*—Robert A. Dawson
*Assistant Examiner*—Sun Uk Kim
*Attorney, Agent, or Firm*—Wenderoth, Lind & Ponack

[57] ABSTRACT

Process for removing sodium sulphate from an aqueous citrate, adipate or phosphate buffer solution used for absorption of $SO_2$ from exhaust gases, by evaporating an aqueous buffer solution at atmospheric pressure at a temperature near its boiling point, thereafter separating the precipitated sodium sulphate and optionally subjecting it to further treatment to recover accompanying buffer salt. The further treatment may consist in a treatment of the precipitated sodium sulphate together with accompanying buffer salt with water at elevated temperature. The solution which is then obtained is mixed with the rest of the buffer solution.

7 Claims, No Drawings

PROCESS FOR REMOVING SODIUM SULFATE FROM AQUEOUS BUFFER SOLUTIONS

This invention relates to a process for purifying aqueous buffer solutions used for absorption of sulphur dioxide ($SO_2$) from exhaust gases. "Purifying" includes in this case also the recovery of buffers from a drawing off liquid flow. Such a drawing off is in many cases necessary in order to prevent impurities which accumulate in the process liquor, from building up to too high concentrations. The most important impurity will be sodium sulphate ($Na_2SO_4$), but other components may also be present.

Impure solutions of the above type are for instance obtained when phosphate, citrate or adipate buffers are used for $SO_2$ recovery from exhaust gases in coal heated boiler plants. In such uses $SO_2$ is absorbed in the buffer solution to form bisulphite ions ($HSO_3^-$). In such process acidic hydronium ions ($H_3O^+$) are liberated which are then taken up by buffer ions to form more of the acidic buffer components. The following reactions are utilized in the absorption plant when for instance phosphate ions represent the buffer system:

$$SO_2(g) = SO_2(l) \qquad (1)$$

$$SO_2(l) + 2H_2O(l) = H_3O^+(l) + HSO_3^-(l) \qquad (2)$$

$$H_3O^+(l) + HPO_4^{2-}(l) = H_2PO_4^-(l) + H_2O(l) \qquad (3)$$

$$SO_2(g) + H_2O(l) + HPO_4^{2-}(l) = HSO_3^-(l) + H_2PO_4^-(l)$$

From the absorption tower the solution is conveyed to the regeneration plant, in which the liquid in this case is evaporated according to Norwegian Patent Application 85.3622. In the process $SO_2$ is driven off together with vaporized water by reversing the reactions (1)–(3), and a concentration and precipitation of $Na_2HPO_4$ takes place and possibly also of the oxidation product $Na_2SO_4$, as the buffers are usually employed in the form of Na salts:

$$NaHSO_3(l) + NaH_2PO_4(l) + nH_2O(l) = SO_2(g) + (n+1)H_2O(g) + Na_2HPO_4(s)$$

(n = a high number).

If citrate or adipate buffers are used instead of phosphate buffers, the regeneration does not take place by evaporation but by regular stripping with open steam in counter current towers. Then the regeneration takes place without any essential change in the liquid volume, by reversing the reactions (1)–(3), in which citrate ions and citric acid ($Ci^{3-}$, $HCi_2^-$, $H_2Ci^-$, $H_3Ci$) or adipate ions and adipic acid ($Ad^{2-}$, $HAd^-$, $H_2Ad$) are included in the reactions (3) instead of the phosphate ions ($HPO_4^{2-}$, $H_2PO_4^-$).

For all said three processes the oxidation loss of $SO_2$ is very small. Nevertheless, some increase of $Na_2SO_4$ in the liquid must be expected, also because the gas from which $SO_2$ is removed, often contains small concentrations of $SO_3$ which are taken up by the buffer solution and which must be neutralized with a Na base (NaOH or $Na_2CO_3$) An obvious possibility to maintain the $Na_2SO_4$ concentration at an acceptable low level, would be to draw off a small flow of process liquid and replace this by fresh buffer solution. For a 500 MW power plant with 0.25 vol % $SO_2$ in the exhaust gas and a sulphate formation corresponding to 0.25% of the amount of $SO_2$, the amount of sulphate will amount to approx. 0.5 kmol/h. If it is desired to keep the sulphate concentration as low as 0.5 kmol/m³ only by removing process liquid, 1 m³ liquid per hour must be drawn off. With typically 3 moles per liter of $Na_2HPO_4$ in the buffer at a price of approx. US $ 1.2 per kilogram, the loss of $Na_2HPO_4$ alone will represent US $ 511 per hour. Even with this low estimate for the sulphate formation, such a drawing off of process liquid to remove $Na_2SO_4$ from the system will lead to unacceptably high losses of $Na_2HPO_4$. In addition it may represent considerable environmental problems. This illustrates that there exists a need for being able to remove $Na_2SO_4$ selectively from the process liquid, i.e. without losing essential amounts of valuable buffer.

The buffer systems discussed herein are all salts of polyvalent acids. The $SO_2$ uptake in the absorption tower displaces the buffer systems towards the more acidic buffer components. When reference is made to a selective removal of $Na_2SO_4$, this means that no buffer components must be lost in essential amounts together with the $Na_2SO_4$ removed. This is a problem to which it has been very difficult to find a satisfactory solution so far, as demonstrated for two cases:

Case 1

In a known process for $SO_2$ recovery from exhaust gases, $SO_2$ is absorbed in an aqueous $Na_2SO_3$ solution to form $NaHSO_3$:

$$SO_2(g) = SO_2(l)$$

$$SO_2(l) + Na_2SO_3(l) + H_2O(l) = 2 NaHSO_3(l)$$

The solution is regenerated by evaporation, whereby $SO_2$ is separated and solid $Na_2SO_3$ crystallizes:

$$2 NaHSO_3(l) + nH_2O(l) = SO_2(g) + (n+1)H_2O(g) + Na_2SO_3(s)$$

(n = high number).

After dissolution of $Na_2SO_3(s)$ the buffer is ready for new absorption. For this "sulphite process" relatively high $SO_2$ losses by oxidation are reported. Na-base is added to neutralize the sulphuric acid formed, and in one modification $Na_2SO_4$ is removed from the absorption solution by cooling crystallization at about 0° C. The salt which is then taken out, is reported to contain a high concentration of valuable buffer salts (1), which are thereby lost. In a modification extra $SO_2$ is added to convert all $Na_2SO_3$ to $NaHSO_3$ in order to improve the selectivity in the $Na_2SO_4$ precipitation (2). In another modification $Na_2SO_4$ is removed by evaporation crystallization at high temperature. It is reported that this modification produces crystals having a lower $Na_2SO_4$ content than the cooling crystallization, which means that it is less selective (3).

Particularly in the evaporation method, solutions having very high salt concentrations will be obtained, and it is then not possible on the basis of solubility data for the individual salts to say, with a reasonable degree of certainty, which selectivity can be obtained. The same uncertainty must also be expected in connection with evaporation of solutions of other salt mixtures.

Case 2

For the above mentioned citrate process, based on $SO_2$ absorption followed by regular steam stripping, there has been developed a multistep method for removing $Na_2SO_4$ from a drawn off flow of process liquid, whereby a very high selectivity is attained (Norwegian Patent 133.546):

Step 1: Removal of Na-citrate by evaporation crystallization.
Step 2: Removal of $Na_2SO_4$ by cooling crystallization.
Step 3: Removal of remaining Na-citrate by evaporation crystallization.

It has been argued against this method that it requires extensive process control, and that sodium citrate must be precipitated by evaporation under vacuum (4). Similar problems and objections may also be expected when the method is used for purifying adipate and phosphate buffers instead of citrate buffers, and there is accordingly a need for a simpler method for removing $Na_2SO_4$ selectively from spent buffer solutions.

Relevant buffer concentrations are 0.25–3.0M for citrate and adipate buffers, and 2.0–5.0M for phosphate buffers. It is normally desirable to keep the $Na_2SO_4$ concentration at no greater than 2.0M, particularly in the range 0.1–2.0M.

On the basis of a comprehensive test program we have now found an unexpectedly simple method for selective removal of $Na_2SO_4$. This method may be adapted to the phosphate, citrate and adipate processes described above. The method is based on our observations that the solubility of $Na_2SO_4$ in solutions simultaneously saturated with $Na_2SO_4$ and one of the buffer salts in question, $Na_2HPO_4$, $Na_2HCi$ or NaHAd, is low at high temperatures, while at the same time the solubility is high for the buffer salts. According to the invention there is provided a process for removing sodium sulphate from aqueous citrate, adipate or phosphate buffer solutions used for absorption of $SO_2$ from exhaust gases, without essential loss of $SO_2$ and valuable buffer components. The process is characterized in that the aqueous buffer solution is evaporated at a temperature close to its normal boiling point to precipitate sodium sulphate, and in that the precipitated sodium sulphate is separated from its mother liquor and subjected to a possible further treatment to separate and recover accompanying buffer salts. Evaporated $SO_2$ and the solution from which the $Na_2SO_4$ crystals have been separated, are returned to the main process. Buffer solutions which are subjected to treatment, may herein be buffer solutions coming from the absorption unit in which they have been charged with $SO_2$, or already regenerated buffer solutions which have been made ready for new absorption. In particular for phosphate buffers the evaporation to remove $Na_2SO_4$ may be combined with the previously mentioned evaporation in the main process, in such a way that only an adjusted part of the already evaporated concentrate is taken out for sulphate removal.

The process is demonstrated by the following three examples:

EXAMPLE 1

Citrate buffer

Procedure:

A controlled and known flow of buffer solution is drawn off from the liquid circulation cycle, for instance after the stripping tower. The liquid is evaporated at elevated temperature, i.e. substantially higher than in the first step of the above process for purifying citrate buffers, suitably at 100° C. and atmospheric pressure. During this process $Na_2SO_4$ crystallizes selectively. The evaporation is terminated before the Na-citrates have reached their saturation concentration. The evaporation may either be carried out as a continuous or as a discontinuous process. Crystallized $Na_2SO_4$ is separated from the mother liquor which is returned to the main process, while the escaping steam, which will contain some $SO_2$, may for instance be combined with the $SO_2$-containing exhaust steam from the stripping tower, so that $SO_2$ values are not lost. Precipitated $Na_2SO_4$ may thereafter be subjected to a new process step in which accompanying buffer components are dissolved in water at elevated temperature and conveyed back to the main process before the final removal of $Na_2SO_4$.

The method is demonstrated in the following by evaporation of a $Na_2HCi$-rich buffer, but may also be used on buffer solutions rich in $NaH_2Ci$ and $H_3Ci$. The latter buffers may be useful in the citrate process for purification of particularly $SO_2$-rich gases.

| Data illustrating the usefulness | |
|---|---|
| Volume of buffer solution drawn off: | 1000 ml |
| Composition: | 1.00M $Na_2CHi$ + 0.5M $Na_2SO_4$ |
| Density of buffer solution: | 1.19 g/ml |
| Calculated starting composition: | |
| $Na_2HCi$: | 19.8% by weight |
| $Na_2SO_4$: | 6.0% by weight |

This solution was evaporated at atmospheric pressure. The evaporation was carried out in a glass flask equipped with a water cooled condenser and a flask for collection of the condensate.

Evaporated amount of water was measured to: 768.0 g

Samples were then taken of crystal-free mother liquor for analysis. Weight and volume of the samples were determined before the samples were analyzed with respect to Na, P and S. The following results were obtained for samples taken at 100° C.:

| | S | Na | C | Density (g/ml) |
|---|---|---|---|---|
| Sample 1 (g/100 g sample) | 0.46 | 12.98 | 21.12 | 1.49 |
| Sample 2 (g/100 g sample) | 0.68 | 11.86 | 18.91 | 1.44 |

From the S- and C-analyses the salt concentrations are calculated to be:

| | $Na_2SO_4$ | $Na_2CHi$ |
|---|---|---|
| Sample 1 (g/100 g) | 2.04 | 69.23 |
| Sample 2 (g/100 g) | 3.01 | 61.97 |

It is calculated that the salt concentrations found in this way correspond to an amount of Na in the samples of 14.2 and 12.3 g/100 g sample, respectively. The Na-analyses are in conformity with these values within reasonable limits of error.

The Na-analyses are considered to be the least accurate of the analyses made.

Mean value for the two samples give for the mother liquor:
65.5% by weight $Na_2HCi$
2.5% by weight $Na_2SO_4$
$\rho = 1.47$ g/ml.

In comparison the solubility of $Na_2SO_4$ in pure water of 100° C. is given as 29.7 g/100 g solution (5), i.e. about 12 times higher than that found in the mother liquor.

Remaining $H_2O$ in mother liquor:

$(1190 - (1.00 \cdot 236.1 + 0.50 \cdot 142) - 768.0 = 114.9$ g

From this the following is calculated:

| | | |
|---|---|---|
| $(114.9/(100 - 65.5 - 2.5))100$ | = | 359.1 g |
| $Na_2SO_4$ in mother liquor 359.1 · 0.025 | = | 8.98 g |
| $Na_2HCi$ in mother liquor 359.1 · 0.655 | = | 235.2 g |

Based on the above the precipitates as percentages are calculated:

$Na_2SO_4: \dfrac{100(0.5 \cdot 142 - 8.98)}{1.0 \cdot 0.5 \cdot 142} = 87.4\%$ $Na_2HCi: \dfrac{100(1.0 \cdot 236.1 - 235.2)}{1.0 \cdot 236.1} = 0.4\%$ In the above example it is assumed that $Na_2SO_4$ is precipitated by evaporation of the buffer solution taken from the flow after the $SO_2$ stripping. It is also possible to precipitate sulphate by evaporation of a $SO_2$-rich solution drawn off from the process liquor which is conveyed to the stripping tower. However, this may entail a somewhat greater risk of corrosion.

EXAMPLE 2

Adipate buffers

Procedure:

Process liquor for $Na_2SO_4$ removal may in this case suitably be drawn off from the flows of process liquor immediately before the absorption column, i.e. after $SO_2$ has been removed by stripping and after free adipic acid ($H_2Ad$) has been removed by cooling crystallization from the return liquid from the stripping tower. (The precipitated adipic acid is returned to the process liquid before stripping to facilitate the removal of $SO_2$, see Norwegian printed specification 155684). Further processing is conducted according to the description from the citrate process.

| Data illustrating the usefulness | |
|---|---|
| Volume of buffer solution drawn off: | 1000 ml |
| Composition: | 1.00M NaHAd + 0.50 M $Na_2SO_4$ |
| Density of buffer solution: | 1.11 g/ml |
| Calculated composition: | 6.4% by weight of $Na_2SO_4$. |

This solution was evaporated at atmospheric pressure.
Amount of water evaporated off: 790.4 g.
The mother liquor was then analysed as described for the citrate buffer, with the following result:
0.13 g S/100 g of sample
7.45 g Na/100 g of sample
28.64 g C/100 g of sample
density $\rho = 1.21$ g/ml.

On the basis of the S- and C-analyses the following salt concentrations are found:
66.8% by weight of NaHAd
0.58% by weight of $Na_2SO_4$ These salt concentrations correspond to a total Na-concentration of 9.33 g/100 g sample. This differs from the analysis by about 25%, which is more than expected on the basis of the assumed uncertainty of the analyses. (As previously mentioned the S- and C-analyses are considered more accurate than the Na-analysis).

Remaining $H_2O$:

$(1110 - (1.00 \cdot 168.1 + 0.50 \cdot 142)) - 790.4 = 80.5$ g

From this the following is calculated:

| | |
|---|---|
| Weight of mother liquor: | $(80.5/(100 - 66.8 - 0.58))$ 100 = 246.6 g |
| $Na_2SO_4$ in mother liquor: | 246.8 · 0.00058 = 1.43 g |
| NaHad in mother liquor: | 246.8 · 0.668 = 164.9 g |
| Percentage precipitated: | |
| $Na_2SO_4$: | 100 − (1.43/142 · 0.5) 100 = 98.0% |
| NaHAd: | 100 − (164.9/168.1) 100 = 1.9%. |

In the example it is assumed that the sulphate precipitation takes place by evaporating the process liquid after the $SO_2$ stripping and adipic acid removal. Alternatively sulphate may be precipitated from $SO_2$-rich liquid from the absorption tower and before the $H_2Ad$-addition. Evaporation of adipic acid rich solution taken from the flow before or after the stripping tower is also a possibility, but there is a risk of coprecipitation of adipic acid which must be avoided.

EXAMPLE 3

Phosphate buffer

Procedure:

The evaporation for regeneration of the process solution in the absorption-stripping-cycle may take place in two steps by allowing the liquid to pass in series or parallel through the two steps, and the exhaust steam from one of the steps serves as a heating medium for the other step (="double effect" evaporation). During the work with the invention it has been found that the precipitate is surprisingly rich in $Na_2SO_4$, in particular this applies to the precipitation in the first step where the steps are arranged in series, and it is sufficient to take out a small part of this precipitate to keep the $Na_2SO_4$ concentration in the process liquid at a desired level. Co-precipitated amounts of $Na_2HPO_4$ and $Na_2S_2O_5$ will be very small and will normally not represent any values of importance. However, the invention also comprises an unexpectedly simple embodiment in which the co-precipitated salts may generally be separated from $Na_2SO_4$ so that the buffer salts may be returned practically quantitatively to the main process.

| Data illustrating the usefulness | |
|---|---|
| Start solution | 2.50M $Na_2HPO_4$ |
| | 0.10M $NaH_2PO_4$ |
| | 0.50M $Na_2SO_4$ |
| | 1.49M $SO_2$ |
| | V = 2.70 l |
| | $\rho = 1.37$ g/cm$^3$. |

The composition corresponds here to a $SO_2$ charged buffer from the absorption tower.

The solution is evaporated at atmospheric pressure, and precipitated salts are separated from the mother liquor by filtration in a pressure filter at 100° C., after the majority of the mother liquor has been removed by decanting clear liquid. The evaporation of decanted liquid is continued together with filtrate for new precipitation, etc. The composition of the filter cakes are then found on the basis of analysis of samples with respect to Na, P, total S and $S^{IV}$-content, after dissolution in water.

Results:

|  | Evaporation steps | | | |
|---|---|---|---|---|
|  | 1 | 2 | 3 | Sum 1-3 |
| (a) | | | | |
| Weight at the start of the evaporation (g) | 3699 | 2471.3 | 2186.7 | |
| (b) | | | | |
| Evaporated before filtration $H_2O + SO_2$ (g) | 1131.8 | 120.7 | 238.4 | 1490.9 |
| (c) | | | | |
| Filter cake, total weight (g) | 50.1 | 111.1 | 108.8 | 270.0 |
| $Na_2SO_4$ (g) | 28.4 | 55.4 | 41.2 | 125.0 |
| $Na_2HPO_4$ (g) | 9.9 | 25.6 | 34.1 | 69.6 |
| $Na_2S_2O_5$* (g) | 6.7 | 15.2 | 16.2 | 38.1 |
| (d) | | | | |
| Weight of decanted liquid and filtrate (g) | 2471.3 | 2186.7 | 1807.0 | |
| (e) | | | | |
| Not found (a) − ((b) + (c) + (d) (g) | 45.8 | 52.8 | 32.5 | |

*$Na_2S_2O_5$ is an anhydride of $NaHSO_3$ which only exists in dissolved form.

Material which has not been recovered represents 1.2-2.1%, and is presumably due to loss of slurry and small amounts of steam and $SO_2$ during the filtration.

From this the following is calculated:

| | |
|---|---|
| Precipitated $Na_2SO_4$, proportion of initial amount | $(125/2.7 \cdot 0.5 \cdot 142) \, 100 = 65\%$ |
| 1) Proportion by weight of $Na_2SO_4$ in the filter cake: | $(125/270) \, 100 = 46\%$ |
| 2) Proportion by weight of $Na_2HPO_4$ in the filter cake: | $(69.6/270) \, 100 = 26\%$ |
| 3) Proportion by weight of $Na_2S_2O_5$ in the filter cake: | $(38.1/270) \, 100 = 14\%$ |
| Sum 1) + 2) + 3) = 86% | |

The missing 14% is assumed to be primarily water. It is remarked that the filter cakes were not washed. Washing would have contributed to reduce the content of phosphate and disulphite in the cakes, since some mother liquor has been included in the analysis.

With reference to the power plant example discussed initially, the maintenance of 0.50M $Na_2SO_4$ in the process liquid will in this case require a salt removal of X kg/h, in which $$X \cdot 0.65/142 = 0.5 \, kmol \, Na_2SO_4/h.$$

From this follows: X = 109 kg/h.
This removal is accompanied by $Na_2HPO_4$: 109·0.26 = 28 kg/h $Na_2S_2O_5$: 109·0.14 = 15 kg/h.

The value of the amount of phosphate is estimated on the basis of the price quoted above to 20·1.2 = 49 US $/h. This amount represents a negligible proportion of the costs connected with the $SO_2$ process.

It it further remarked that totally 79.7 g $SO_2$ and 1411.2 g $H_2O$ have been removed by the evaporation in the example given. In comparison the content of $H_2O$ in the initial solution is calculated to be:

$$\frac{2.7}{(1370-(2.5 \cdot 142+0.1 \cdot 120+0.5 \cdot 142+1.49 \cdot 64))} = 22\text{-}59 \, g.$$

According to this the amount of water evaporated off is:

$$(1411.2/2259)100 = 62 \% \text{ of the initial amount.}$$

Thus, the amount of water removed by evaporation is almost the same as that which would be suitable to evaporate in the first step in a two step evaporation process.

The example given herein was started with 0.1 mole/l of the acidic buffer salt $NaH_2PO_4$. It has been found that the method is equally suitable for higher concentrations of this salt. As an example, after evaporating off 1385.9 g $H_2O + SO_2$ from a buffer with the initital composition 2.5M $Na_2HPO_4$+0.50M $NaH_2PO_4$+0.50M $Na_2SO_4$ +1.20M $SO_2$, 193.5 g of filter cake was filtered off, with a composition 48% $Na_2SO_4$, 31% $Na_2HPO_4$ and 18% $Na_2S_2O_5$.

Separation of co-precipitated buffer components from $Na_2SO_4$

Examples 1-2 above illustrate very good selectivity for the sulphate precipitation from the citrate and adipate buffers respectively, while example 3 indicates a lower selectivity for the phosphate buffer. In particular when phosphate buffers are used, but also with adipate and citrate buffers, for instance when the process control is not as good as illustrated in examples 1 and 2, particularly so that the evaporation goes much further than illustrated above, an embodiment will therefore be desirable which ensures that a negligible proportion of buffer salts are lost together with precipitated $Na_2SO_4$. In particular for the phosphate buffer this may be the case when the $Na_2SO_4$ removal is started with finally evaporated and concentrated buffer/slurry from the regeneration part of the main process. It is thereby achieved that the removed $Na_2SO_4$ has a high purity and thereby becomes simpler to sell commercially, or deposit. The essence of this part of the invention is that the $Na_2SO_4$ precipitate from the evaporation step is subjected to a treatment with pure water at elevated temperature for selective solution of co-precipitated buffer salts. The solution which is thereby obtained is mixed with the rest of the buffer solution. The method is demonstrated with the following examples of results in laboratory experiments.

EXAMPLE 4

Citrate buffer

| Initial mixture of solid salts: | $Na_2HCi$ | 25 g |
|---|---|---|
| | $Na_2SO_4$ | 100 g. |

This mixture corresponds to a sulphate precipitation from a too advanced evaporation.

40 g of H$_2$O were added to the "precipitate" in a closed glass flask equipped with stirrer, thermostated heating means, and a water cooled condenser for returning evaporated water. After 4 hours' treatment at 100° C. a sample of clear liquid was taken out and analysed as explained above. Within the expected accuracy of analysis, 100% of the initial amount of NaHPO$_4$ and 6.5% of Na$_2$SO$_4$ were recovered in the resulting solution.

EXAMPLE 5

Adipate buffer

| Initial mixture | NaHAd: | 25 g |
|---|---|---|
| | Na$_2$SO$_4$: | 100 g |
| | H$_2$O: | 50 g |

The experiment was carried out as described for the citrate buffer. The resulting solution was found to contain 100% NaHAd and 8.2% of Na$_2$SO$_4$ in the initial mixture.

EXAMPLE 6

Phosphate buffer

| Initial mixture | Na$_2$HPO$_4$: | 50 g |
|---|---|---|
| | Na$_2$SO$_4$: | 100 g |
| | H$_2$O: | 90 g |

The experiment was carried out as described for the citrate buffer. Within the accuracy of analysis the resulting solution was found to contain 100% of Na$_2$HPO$_4$ and 14% of Na$_2$SO$_4$ in the initial mixture.

The results in examples 4–6 illustrate that in this embodiment all the buffer will be recovered, while only Na$_2$SO$_4$ will be removed from the system. The fact that some Na$_2$SO$_4$ will accompany the buffer is insignificant, since there is no need for or desire to remove Na$_2$SO$_4$ completely, but only to keep the Na$_2$SO$_4$ concentration in the buffer solution at a suitably low level.

References (1) NATO-CCMS STUDY. PHASE 1.1. Status Report on the Sodium Sulfite Scrubbing Flue Gas Desulfurization Process. US EPA, Washington DC. PEDCO Environmental, Cincinnati, Ohio. Contract No 68-01-4147, August 1978.
(2) DE-OS 25 06 666
(3) Pedroso, R. I. and Press, K. M. Sulphur recovered from flue gas at large coal fired power plants. In: "The Control of Sulphur and Other Gaseous Emissions", p F1–F20. 3rd Int. Symp., Salford (UK) 1979. EFCE Publ. Series No. 4.
(4) Keeth, R. S., Ireland, P. A. and Moser, R. E. Economic Evaluation of 24 FGD-Systems. EPA/EPRI FGD Symposium. Atlanta, Ga., Nov. 18–21, 1986.
(5) Ullmann 4. Auflage, Band 17, p. 211.

I claim:

1. A process for removing sodium sulphate from an aqueous citrate, adipate or phosphate buffer solution used for absorption of SO$_2$ from exhaust gases, which comprises evaporating the aqueous buffer solution at a temperature close to its normal boiling point to precipitate sodium sulphate, and separating the precipitated sodium sulphate from the buffer solution, and optionally subjecting the separated sodium sulphate to a treatment with water at elevated temperature to dissolve and recover accompanying buffer salts which are conveyed back to the buffer solution.

2. The process according to claim 1, wherein a citrate buffer solution used for absorption of SO$_2$ is subjected to a stripping of SO$_2$ with steam, prior to the evaporation and separation.

3. The process according to claim 1, wherein an adipate buffer solution used for absorption of SO$_2$ is subjected to a stripping of SO$_2$ with steam and subsequent cooling for precipitation of free adipic acid, prior to the evaporation and separation.

4. The process according to claim 1, wherein a phosphate buffer solution is evaporated directly after the SO$_2$ absorption.

5. The process according to claim 4, wherein the phosphate buffer solution is evaporated in two or more steps, a salt which primarily consists of sodium sulphate being precipitated in a first step, and a salt which in addition to sodium sulphate also contains phosphate buffer salts being precipitated in the subsequent step or steps, said salt precipitated in said subsequent step or steps being subjected to a treatment with water at elevated temperature to dissolve and recover phosphate buffer salts.

6. The process according to any one of claims 1–5, wherein the buffer solution after SO$_2$ absorption is separated into a first stream containing a minor part of the buffer solution and a second stream containing a major part of the buffer solution, said first stream is subjected to said process for removing sodium sulfate, and the resultant purified buffer solution is mixed with said second stream so that the concentration of sodium sulphate in the resultant mixture is kept at no greater than 2.0M.

7. The process according to claim 6, wherein the concentration of sodium sulphate in said resultant mixture is kept in the range 0.1–2.0M.

* * * * *